United States Patent
Scheibe (10) Patent No.: US 9,829,354 B2
(45) Date of Patent: Nov. 28, 2017

(54) SENSOR ARRANGEMENT, SENSOR AND CABLE FOR USE IN PROCESS AUTOMATION

(71) Applicant: Endress + Hauser Conducta Gesellschaft für Mess- und Regeltechnik mbH + Co. KG, Gerlingen (DE)

(72) Inventor: Sven-Matthias Scheibe, Dresden (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 69 days.

(21) Appl. No.: 14/933,252

(22) Filed: Nov. 5, 2015

(65) Prior Publication Data
US 2016/0131506 A1 May 12, 2016

(30) Foreign Application Priority Data
Nov. 7, 2014 (DE) .................. 10 2014 116 236

(51) Int. Cl.
*H01R 13/62* (2006.01)
*H01R 35/04* (2006.01)
(Continued)

(52) U.S. Cl.
CPC ......... *G01D 11/30* (2013.01); *H01R 13/6277* (2013.01); *H01R 13/6205* (2013.01);
(Continued)

(58) Field of Classification Search
CPC ............... H01R 9/0503; H01R 13/567; H01R 2103/00; H01R 24/40; H01R 13/639;
(Continued)

(56) References Cited

U.S. PATENT DOCUMENTS

| | | | | |
|---|---|---|---|---|
| 6,074,217 A | * | 6/2000 | Maruyama | ............. H01R 24/40 439/581 |
| 6,945,818 B2 | * | 9/2005 | Yamane | ............... H01R 9/0503 439/582 |

(Continued)

FOREIGN PATENT DOCUMENTS

| | | |
|---|---|---|
| CN | 1581601 A | 2/2005 |
| CN | 101645552 A | 2/2010 |

(Continued)

*Primary Examiner* — Harshad R. Patel
*Assistant Examiner* — Brandi Hopkins
(74) *Attorney, Agent, or Firm* — Christopher R. Powers; PatServe (57) ABSTRACT

A sensor arrangement and cable for use in process automation, including a sensor having at least one sensor element for recording a value in process automation, a first interface for transmitting a measured value depending on the measured value to a second interface, the first interface including a first mechanical, and a cable for transmitting the value to a superordinate unit, the cable including said second interface, which is complementary to the first interface, and a second mechanical coupling complementary to the first mechanical coupling, wherein the second interface and mechanical coupling are arranged in a cable housing, wherein the sensor is detachably connectible to the cable by the first mechanical coupling and the second mechanical coupling, characterized in that the second mechanical coupling is arranged at an angle less than 180° to the longitudinal axis of the cable housing.

19 Claims, 3 Drawing Sheets

(51) Int. Cl.
*G01D 11/30* (2006.01)
*H01R 13/627* (2006.01)
*H01R 13/639* (2006.01)
*H01R 101/00* (2006.01)

(52) U.S. Cl.
CPC ............ *H01R 13/639* (2013.01); *H01R 35/04* (2013.01); *H01R 2101/00* (2013.01); *H01R 2201/20* (2013.01)

(58) Field of Classification Search
CPC ............ H01R 2201/20; H01R 2101/00; H01R 13/6277; H01R 13/6205; H01R 35/04; G06F 13/4022; G06F 13/4282; G01D 11/30; H04L 67/12; Y10S 439/902
USPC .............................................. 73/152.18, 866.5
See application file for complete search history.

(56) References Cited

U.S. PATENT DOCUMENTS

2010/0281987 A1* 11/2010 Buschnakowski ....... G01H 3/00
  73/658
2014/0167519 A1* 6/2014 Pilz ..................... H04B 5/0031
  307/91

FOREIGN PATENT DOCUMENTS

| CN | 202308515 U | 7/2012 |
| CN | 103872525 A | 6/2014 |
| JP | 2009093830 A | 4/2009 |

* cited by examiner

PRIOR ART

SENSOR ARRANGEMENT, SENSOR AND CABLE FOR USE IN PROCESS AUTOMATION

TECHNICAL FIELD

The invention relates to a sensor arrangement for use in process automation. Furthermore, the invention relates to a cable and a sensor.

BACKGROUND DISCUSSION

In process automation, sensors are connected to a cable by means of a mechanical coupling, often by means of a bayonet closure. The cable, in turn, is connected to a superordinate unit, such as a measuring transducer or a control center. The sensor and cable respectively have an interface, e. g. an inductive or optical interface, by means of which the sensor is supplied with energy and communication from sensor to cable and to the superordinate unit is ensured. This is described, for example, in European Patent EP 1 625 643.

Particularly, the "Memosens" products of Endress+ Hauser should be referred to here. Further generic designs are e. g. "Memosens" by the company Knick, "ISM" by Mettler-Toledo, the "ARC" system by Hamilton and the "SMARTSENS" by Krohne.

The currently used sensors and cables are axially plugged together and locked appropriately. In the plugged condition, the sensor housing and the cable housing are in axial arrangement to each other. Furthermore, the sensor element on the sensor side, e. g. an element to determine a pH value, as well as the connector on the cable side to the superordinate unit are likewise arranged in the axial direction to their corresponding interfaces. This results in a rigid arrangement that, depending on the length of the sensor, can have an axial length of approximately 25 to 85 cm. The cable is flexible to a large extent and can be up to 100 m long.

Due to the rigid and axial arrangement of cable and sensor, problematic measurement setups may occur under certain usage conditions, such as with a beaker in a laboratory. Thus, it may happen that the beaker is overturned by the sensor-cable arrangement's own weight. Consequently, precautions have to be put in place to effectively prevent such a possible scenario, see in FIG. 1.

Figure 1:
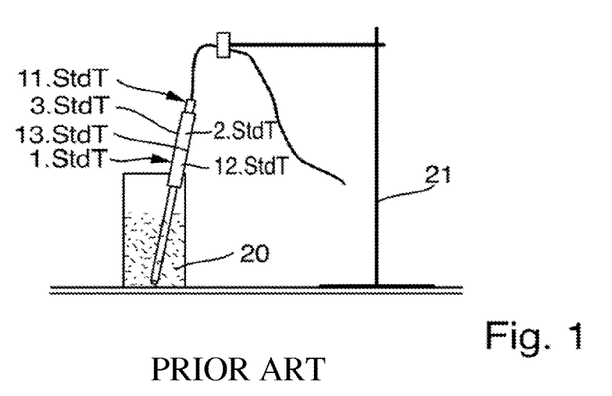

FIG. 1 shows a sensor 1.StdT with a cable 11.StdT. The sensor 1.StdT is in a glass together with the medium 20 to be measured. On the sensor 1.StdT or on the cable 11.StdT, the mechanical couplings 2.StdT and 12.StdT, as well as the interfaces 3 and 13 are located. The cable 11.StdT is held by a support 21 in such a way that the sensor 1. StdT cannot tip over. An additional support 21 is inconvenient and complex. Furthermore, it makes disconnecting the sensor 1. StdT from the cable 11. StdT harder or, depending on the support arrangement, the couplings 2.StdT and 12.Stdt may be hardly accessible or not accessible at all.

SUMMARY OF THE INVENTION

The invention is based on the object to overcome the disadvantages of the state of the art. In particular, a sensor-cable combination is proposed that can be handled flexibly and used in many areas of application.

The object is solved by means of a sensor arrangement, a cable and a sensor. As mentioned above, the object is met by a sensor arrangement. The sensor arrangement comprises: a sensor comprising at least one sensor element for recording a measured value in process automation, a first interface for transmitting a measured value depending on the measured value to a second interface, and a first mechanical coupling that comprises the interface; a cable for transmitting the measured value depending on the measured value to a superordinate unit comprising a second interface that is complementary to the first interface, a second mechanical coupling complementary to the first mechanical coupling, wherein the second interface and the second mechanical coupling are arranged in a cable housing at least in sections, wherein the sensor is connectible to the cable in a detachable way by means of the first mechanical coupling and the second mechanical coupling, particularly by way of a snap connection, wherein the sensor is thus connectible to the superordinate unit via the cable, wherein the first and second interfaces are designed for bidirectional communication between the sensor and superordinate unit, wherein the first and second interfaces ensure the energy supply of the sensor as well as the communication. The sensor arrangement is characterized in that the second mechanical coupling is arranged at an angle less than 180° to the longitudinal axis of the cable housing.

Thus, the axial arrangement of the present sensor-cable combination is abandoned. This results in a number of advantages. For example, in case of the aforementioned setup with a beaker, the stability of laboratory setups is increased, as the tilting moment is drastically lowered. Additional supports to increase the stability of the sensor are avoided. Altogether, a space-saving setup is achieved. Moreover, additional areas of application can be envisaged, as the couplings are easier to access.

In a favorable further development, the first mechanical coupling is arranged at an angle less than 180° to the longitudinal axis of the sensor. Thereby, an even greater flexibility can be achieved and further arrangements of sensor to cable are possible.

Preferably, the angle between the longitudinal sensor axis and the first mechanical coupling and/or between the longitudinal cable housing axis and the second mechanical coupling is 90°. Alternatively, this angle may be 45°.

In a preferred arrangement, the cable comprises a joint, wherein the joint divides the cable housing into a first and a second section, wherein the first section comprises the second interface and the second mechanical coupling, wherein the second section comprises a cable attachment, wherein the cable attachment and a connector make the cable housing connectible to the superordinate unit and wherein the joint is rotatable. This further enhances the flexibility of the cable. Additional mobility is provided.

In a first version, the joint is a joint with one degree of freedom and, in particular, a swivel joint that is rotatable with a rotation angle between −180° and +180°.

Preferably, the joint is designed to adjust the rotation angle of the joint in steps, and the joint comprises a locking device, particularly with detents, wherein the locking device fixates the first section in rotation angle position to the second section. Thus, the joint can be adjusted in steps, wherein the steps can be fixated. The operator can thus adjust and fixate the angle as needed.

Alternatively, the joint is designed for a continuous adjustment of the rotation angle on the joint.

In order to ensure that even with continuous adjustment of the rotation angle, the rotation angle can be fixated, the joint comprises a brake device, wherein the brake device is designed to fixate the adjusted rotation angle, and wherein the brake device ensures a force fit between the first section and the second section.

In a second version, the joint is designed as a joint with three degrees of freedom, in particular, as a ball joint.

In a favorable design, the interfaces are designed as inductive interfaces.

In a preferred further development, the first mechanical coupling and the second mechanical coupling is designed as a plug-in connection, and comprises, in particular a tongue and a groove. This ensures full flexibility of the cable-sensor combination, as the coupling is in itself rotatable about 360°. The couplings can be quickly plugged in and out, as they are held together by the plug-in connection, thus virtually spring-like elements and no additional lock has to be operated. This is similar to a push button.

In a favorable design, one of the two couplings comprises a notch and the other coupling comprises a projection, in particular a spring, that is complementary to the notch, and wherein the projection engages the notch for joining the couplings. Thus, the notch provides an undercut and the projection engages that undercut. To connect the cable to the sensor, the mechanical couplings are pushed together until the projection engages the notch. To disconnect the sensor from the cable, the mechanical couplings can be pulled until they disengage from each other.

To secure the mechanical connection, one of the couplings comprises a lock ring, wherein the lock ring is designed in such a way that it locks the mechanical connection, particularly spring-loaded, so that an involuntary disengagement of the mechanical connection is prevented, wherein, in order to disengage the connection between the first and the second mechanical coupling, the lock ring is designed in such a way that by turning, pushing, pulling and/or pressing the lock ring, the mechanical connection between the couplings is released and an intentional disengagement takes place.

As an alternative to a purely mechanical connection, the first mechanical coupling and the second mechanical coupling are designed as a magnetic connection. This is likewise a simple method for connecting the two mechanical couplings with each other. A simple plugging in and pulling apart is likewise possible.

In a preferred arrangement, the sensor is a pH sensor, also as ISFET, generally an ion-selective sensor, a sensor for measuring the redox potential, the absorption of electromagnetic waves in a medium, e. g. with wavelengths in the UV, IR and/or visible range, of oxygen, of conductivity, of turbidity, of concentration of non-metallic materials or of temperature.

In a favorable design, the superordinate unit is a transmitter or a control center, wherein the sensor comprises an intelligent unit, in particular a microcontroller, and the intelligent unit converts the measured value that is dependent on the measured value into a protocol that is intelligible for the transmitter or the control center.

In a favorable development, the intelligent unit comprises circuitry elements for the recording, processing and transfer of measured values that depend on the measured value to the superordinate unit. The circuitry elements encompass, for example, analogue sensor electronics, an analogue-to-digital converter for conversion of the recorded analogue values into digital values, a computing unit and a communication unit for processing and transfer of the digital measured values to the superordinate unit, i. e. a transmitter or a control center, according to a protocol that can be understood by the superordinate unit, such as a standard communication protocol commonly used in process automation engineering.

Preferably, the superordinate unit is a control center and the protocol that is intelligible to the control center comprises HART, wirelessHART, Modbus, Profibus Fieldbus, WLAN, ZigBee, Bluetooth or RFID.

Furthermore, the object is solved by a cable for the transmission of the measured value that depends on the measured value to a superordinate unit, the cable comprising: an interface; and a mechanical coupling, wherein the interface and the mechanical coupling are, at least in sections, arranged in a cable housing, wherein a sensor is connectible to the cable via the mechanical coupling and the mechanical coupling can be connected or disconnected, in particular by engaging, wherein the sensor is thus connectible to the superordinate unit via the cable, wherein the interface is designed for bidirectional communication between sensor and superordinate unit, and wherein the interface ensures the energy supply of the sensor in addition to the communication. The cable is characterized in that that the mechanical coupling is arranged at an angle less than 180° to the longitudinal axis of the cable housing.

Further, the object is solved by a sensor comprising: at least one sensor element for recording a measured value in process automation; and a first interface for the transmission of the measured value that depends on the measured value to a second interface, and a first mechanical coupling that comprises the interface. The sensor is characterized in that the first mechanical coupling is arranged at an angle less than 180° to the longitudinal axis of the sensor.

BRIEF DESCRIPTION OF THE DRAWINGS

The invention is explained in more detail by means of the following figures. It shows FIG. 1 a prior art sensor.

In the figures, the same features are designated with the same reference numbers.

DETAILED DESCRIPTION IN CONJUNCTION WITH THE DRAWINGS

A sensor arrangement 10 according to the invention comprises a sensor 1 and a cable 11.

The sensor 1 comprises at least one sensor element 4 for recording a measured value in process automation. The sensor 1 is then for example a pH sensor, also as ISFET, generally an ion-selective sensor, a sensor for measuring the redox potential, the absorption of electro-magnetic waves in a medium, e. g. with wavelengths in the UV, IR and/or visible range, of oxygen, of conductivity, of turbidity, of concentration of non-metallic materials or of temperature, with the corresponding measured values.

Furthermore, the sensor 1 comprises a first mechanical coupling 2 that comprises a first interface 3. The first interface 3 is designed for transmission of a value depending on the measured value to a second interface 13. The sensor 1 usually comprises a data processing unit, e. g. a microcontroller (not shown), that processes the values of the measured value, converts them into a different format for example. Thus, the data processing unit can handle transmission, pre-processing and digital conversion of values.

The cable 11 comprises a second interface 13, wherein the second interface 13 is designed complementary to the first interface 3. The cable 11 comprises a second mechanical coupling 12, that is designed complementary to the first mechanical coupling 2. The second mechanical coupling 12 and the second interface 13 are arranged in a cable housing 14 at least in sections. The cable housing 14 typically has a rectangular cross-section, i. e. the cable housing has a longitudinal axis C and a lateral axis D. Naturally, a square cross-section is likewise possible, the longitudinal axis C then is the axis that runs in the direction of the cable attachment 19, i. e. in the direction of the connection piece between cable housing 14 and a superordinate unit 22 (see below). The lateral axis D runs perpendicular to the longitudinal axis C. "Cable attachment" should designate the area of the cable housing 14, where the connecting piece between cable housing 14 and superordinate unit 22 is attached.

Figure 3A:
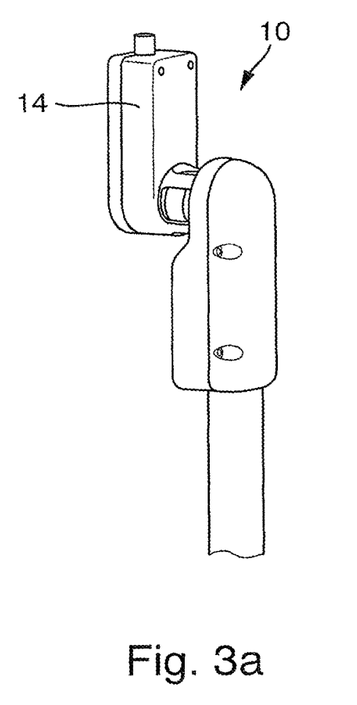
FIG. 3a and FIG. 3b a sensor arrangement according to the invention shown in FIG. 2a in a connected (FIG. 3a) and a disconnected (FIG. 3b) arrangement.
Figure 3B:
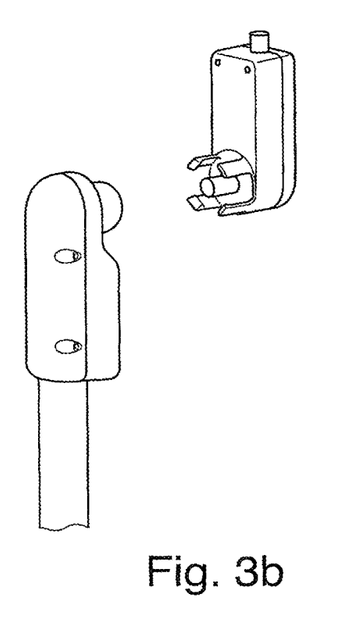

The sensor 1 is connectible to the cable 11 via the first mechanical coupling 2 and the second mechanical coupling 12 in a detachable fashion. The mechanical couplings 2, 12 can thus be plugged into each other. In one design, the second mechanical coupling 12 engages the first mechanical coupling 2. The function of the two mechanical couplings 2, 12 is similar to that of a push button. FIG. 3a and FIG. 3b show a sensor arrangement 10 in a plugged-in position and in a separated position.

Figures 4A, 4B:
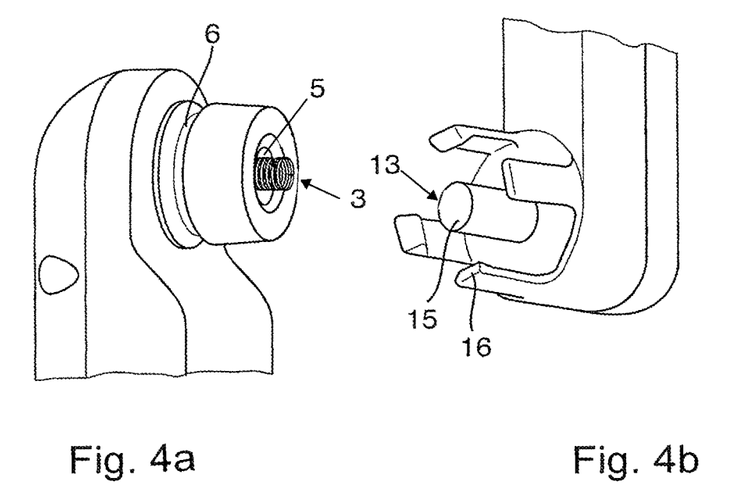
FIG. 4a and FIG. 4b a detailed view of a first (FIG. 4a) and a second (FIG. 4b) mechanical coupling.

FIG. 4a and FIG. 4b show a magnified view of the first and the second mechanical coupling 2, 12. Thereby, the first mechanical coupling 2 comprises a groove 5, and the second mechanical coupling 12 a tongue 15. "Tongue" in the sense of the invention should preferably mean a cylindrical elevation that engages a preferably similarly cylindrical indentation, thus the groove. Possible designs other than the cylindrical form mentioned above, such as cross shape, as hollow cylinder, rectangular, square etc. should likewise be mentioned for the sake of completeness and shall also be designated as "tongue" and the respective counterpart as "groove".

Thus, the first mechanical coupling 2 has an altogether cylindrical design, and the groove 5, as mentioned above, is actually the inner diameter. On the outer diameter, the mechanical coupling 2 comprises a circumferential notch 6. The opposite side, i. e. the cable 11 on the second mechanical coupling 12, comprises a projection 16 that is in particular designed as a spring. Thus, the notch 6 provides an undercut and the projection 16 engages that undercut. To connect the cable 11 to the sensor 1, the mechanical couplings 2, 12 are pushed together until the projection 16 engages the notch 6. To disconnect the sensor 1 from the cable 11, the mechanical couplings 2, 12 can be pulled until they disengage.

Naturally, the connecting elements can likewise be arranged in the respective other part (sensor 1 or cable 11).

In addition, one of the two mechanical couplings 2, 12 comprises a lock ring (not depicted) that prevents an unintended or haphazard disengaging of the sensor arrangement 10. The lock ring is designed in such a way that it locks the mechanical connection between the couplings 2, 12, so that an involuntary disengaging of the mechanical connection is prevented. An example for such a locking mechanism is a spring-loaded lock. In order to disengage the mechanical connection between the first and the second mechanical coupling 2, 12, the lock ring is designed in such a way that by turning, pushing, pulling and/or pressing of the lock ring the mechanical connection between the couplings 2, 12 is released and an intentional disengagement takes place.

Alternatively and not depicted, the first mechanical coupling 2 and the second mechanical coupling 12 are designed as a magnetic connection.

The sensor 1 can be connected via the interfaces 3, 13 and the cable 11 to a superordinate unit 22. The superordinate unit 22 is, for example, a transmitter or a control center. The data processing unit converts the value that depends on the measured value into a protocol that can be understood by the transmitter or the control center. Examples for this are the proprietary Memosens protocol or HART, wirelessHART, Modbus, Profibus Fieldbus, WLAN, ZigBee, Bluetooth or RFID. Instead of the data processing unit, this conversion can likewise be performed in a separate communication unit, wherein the communication unit can be arranged on the side of the sensor 1 or on the side of the cable 11. Wireless protocols are also included among the aforementioned protocols, so that a respective communication unit comprises a wireless module.

The first and second interfaces 2, 12 are designed for bidirectional communication between the sensor 1 and the superordinate unit 22. In addition to the communication, the first and second interface 2, 12 likewise ensure the energy supply for the sensor 1.

The interfaces 2, 12 are designed as inductive interfaces. Alternatively, e. g. an optical interface can likewise be used.

Generally, the second mechanical coupling 12 is arranged at an angle less than 180° to the longitudinal axis C of the cable housing 14, i. e. to the cable attachment 19 on the cable housing 14.

Figure 2A:
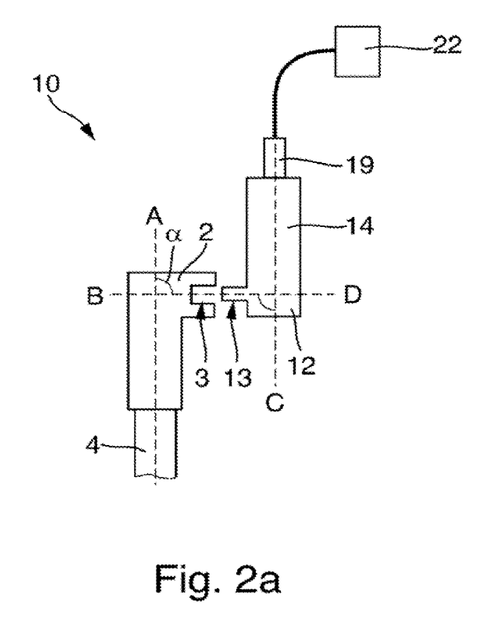
FIG. 2a and FIG. 2b a sensor arrangement according to the invention in a first (FIG. 2a) and a second (FIG. 2b) design.

FIG. 2a shows a first design of the sensor arrangement 10 according to the invention. The angle α between the longitudinal axis C of the cable housing 14 and the second mechanical coupling 12 thereby corresponds to 90°. The longitudinal axis C and the lateral axis D form four quadrants, wherein the angle α in the third quadrant (see FIG. 2a) equals −90° in the mathematical sense.

Figure 2B:
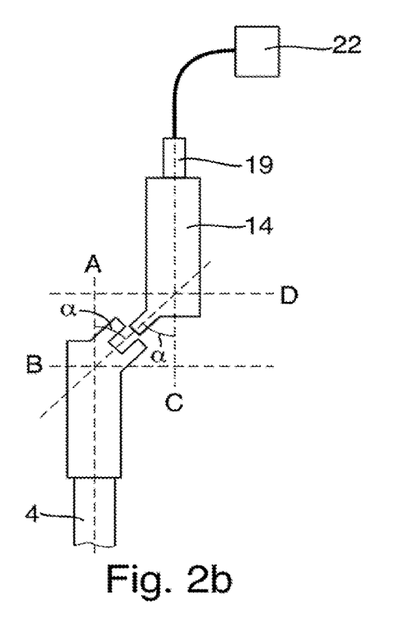

FIG. 2b shows a second design of the sensor arrangement 10 according to the invention. In that case, the angle α between the longitudinal axis C of the cable housing 14 and the second mechanical coupling 12 is 45°. The longitudinal axis C and the lateral axis D form four quadrants, wherein the angle α in the third quadrant (see FIG. 2b) equals −45° in the mathematical sense.

In one design, the first mechanical coupling 2 is arranged at an angle α less than 180° to the longitudinal axis A of the sensor 1. The sensor 1 usually has a length expansion, which is the reason why a longitudinal axis A and a perpendicular lateral axis B can be defined.

FIG. 2a shows one version of this design. The angle α between the longitudinal axis A of the sensor 1 and the first mechanical coupling 2 thereby corresponds to 90°. The longitudinal axis A and the lateral axis B form four quadrants, wherein the angle α in the first quadrant (see FIG. 2a) equals −90° in the mathematical sense.

FIG. 2a shows a second version of this design. The angle α between the longitudinal axis A of the sensor 1 and the first mechanical coupling 2 thereby corresponds to 45°. The longitudinal axis A and the lateral axis B form four quadrants, wherein the angle α in the first quadrant (see FIG. 2b) equals −45° in the mathematical sense.

FIG. 5 shows a third design of the sensor arrangement 10 according to the invention. Two points need to be mentioned here. Firstly, the first mechanical coupling 2 is arranged in the direction of the longitudinal axis A of the sensor 1. The version presented in FIG. 5, with the cable 11 having a joint 17 (see below), can also be used with the arrangement of the mechanical coupling 2 as shown in FIG. 2a or FIG. 2b. Secondly, FIG. 5 shows a cable 11 comprising a joint 17.

The joint 17 divides the cable housing into a first and second section 14.1, 14.2, wherein the first section 14.1 comprises the second interface 13 and the second mechanical coupling 12 and the second section 14.2 comprises the cable attachment 19.

By means of the joint 17, the first section 14.1 can be turned by an angle β in relation to the second section 14.2.

Figure 5A:
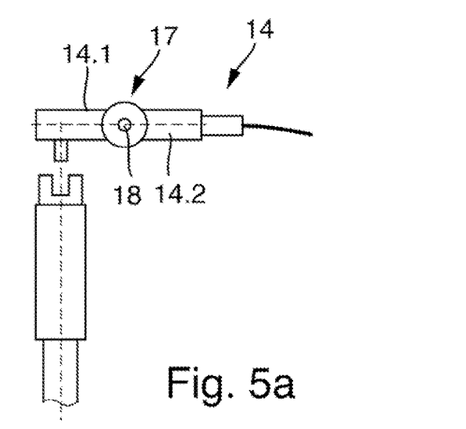
FIG. 5a, FIG. 5b, FIG. 5c and FIG. 5d a sensor arrangement according to the invention in a third design with angles of 0° (FIG. 5a), +45° (FIG. 5b) and −45° (FIG. 5c) of a joint in a first design and a second design (FIG. 5d)
Figure 5B:
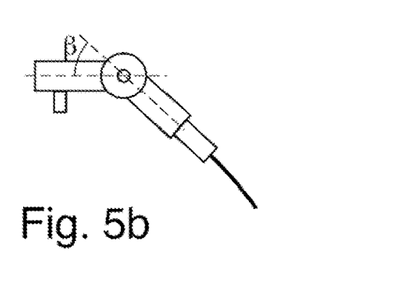
Figure 5C:
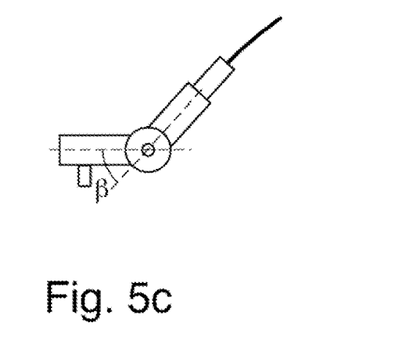

In a first version, the joint 17 is designed as a joint with one degree of freedom, for example as a swivel joint. An alternative design is a hinge. Thus, the joint 17 can be turned by a rotation angle β from −180° to +180°.

In this particular version of the joint, the joint 17 comprises a pin 18, that engages the respective eyelets on the first and the second section 14.1, 14.2. Typically, one of the two sides (i. e. either the first or the second section 14.1/14.2) comprises one eyelet, while the respective other one comprises two eyelets, that are arranged above one another, with the single eyelet in the center. The pin 18 is either designed as a screw, wherein it is secured by a respective nut (not depicted), or the pin 18 is secured by means of a material bond, such as riveting, welding etc.

The joint 17 can likewise be arranged at any other angle to the longitudinal axis B, such as 90° in relation to the arrangement shown in FIG. 5a/b/c. In FIG. 5a/b/c, the pin 18 is arranged perpendicular to the second mechanical coupling 12; a parallel arrangement is an alternative.

The angle β can be adjusted continuously or in steps. When adjusting the joint 17 in steps, a locking device (not depicted) is provided on joint 17 that is designed for locking the joint 17 at the angle β once it has been adjusted in steps. The locking device is designed, for example, as a locking device with detents.

When joint 17 is adjustable continuously, it comprises a brake device (not depicted) to fixate the adjusted angle β in place. The brake device creates a force fit between the first section 14.1 and the second section 14.2. The simplest form for this to happen is by applying pressure, as in case of such a forced connection both parts, i. e. the first section 14.1 and the second section 14.2 exert a normal force on each other. Their mutual displacement is prevented, as long as the counterforce created by static friction (for example a twisting by hand) is not exceeded. Alternatively, but still belonging to the force fit category, a screw can be used, wherein in the tightened state a twisting at the angle β is prevented.

Figure 5D:
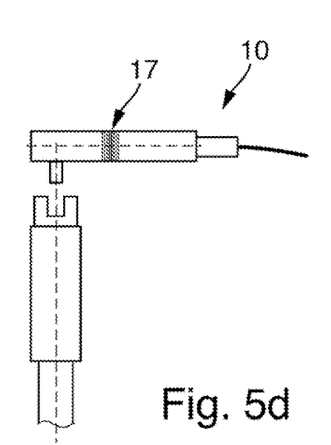

In a second design in FIG. 5d, the joint 17 consists of individual rigid parts that are connected with each other.

In a further variant, the joint 17 is designed as a joint with three degrees of freedom, in particular, as a ball joint (not depicted). This allows the cable 14 or the second section 14.1 to be turned in even more angles in relation to the first section 14.1.

Figure 6:
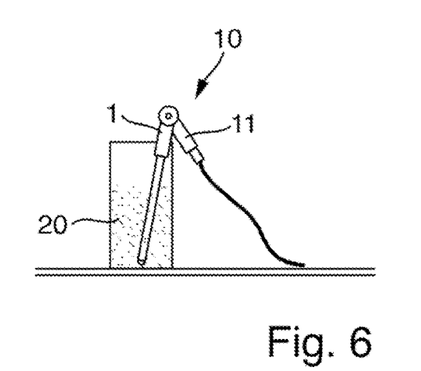
FIG. 6: is an application example of the sensor arrangement according to the invention.

FIG. 6 shows an application example of the sensor arrangement 10 according to the invention in a beaker with the medium 20 to be measured. The cable 11 is bent over in relation to the sensor 1. An additional support is not required, as the tilting moment of the setup is substantially reduced compared to the state of the art.

A further advantage to be mentioned lies in the full flexibility of the sensor arrangement 10, as the coupling 2, 12 can be turned in itself by an angle of 360°.

In addition to that, a quick plugging in and disconnecting is possible, as the coupling is held together by spring-like elements that do not require an additional lock to be operated.

The invention claimed is:

1. A sensor arrangement for use in process automation, comprising:
   a sensor comprising:
      at least one sensor element for recording a measured value in process automation, a first interface structured to transmit a value that depends on the measured value to a second interface, and a first mechanical coupling that includes the first interface; and
   a cable for transmitting the value depending on the measured value to a superordinate unit, the cable including said second interface, which is complementary to said first interface and a second mechanical coupling complementary to said first mechanical coupling, wherein:
   said second interface and said second mechanical coupling are arranged in a cable housing having a first section and a second section, the first section including said second interface and said second mechanical coupling;
   the sensor is detachably connected to the cable by said first mechanical coupling and said second mechanical coupling
   and further to said superordinate unit via said cable;
   said first and said second interfaces are configured for bidirectional communication between the sensor and said superordinate unit
   and further to enable energy supply to the sensor and communication to the superordinate unit;
   said second mechanical coupling is arranged at an angle of less than 180° to a longitudinal axis of the first section of said cable housing; and
   said cable includes a rotatable joint between the first section and the second section of said cable housing, the second section including a cable attachment configured to reversibly connect the cable housing to the superordinate unit.

2. The sensor arrangement according to claim 1, wherein:
   said first mechanical coupling is arranged at an angle less than 180° to a longitudinal axis of the sensor.

3. The sensor arrangement according to claim 1, wherein:
   said angle between a longitudinal axis of the sensor and said first mechanical coupling and/or between said longitudinal axis of the first section of said cable housing and said second mechanical coupling is 90°.

4. The sensor arrangement according to claim 1, wherein:
   said angle between a longitudinal axis of the sensor and said first mechanical coupling and/or between said longitudinal axis of the first section of said cable housing and said second mechanical coupling is 45°.

5. The sensor arrangement according to claim 1, wherein:
   said joint is a joint with one degree of freedom rotatable by a rotation angle between −180° and +180°.

6. The sensor arrangement according to claim 5, wherein:
   for adjusting the rotation angle, said joint is designed to be turned in steps, and said joint includes a locking device having detents, said locking device structured to reversibly fix said first section at the rotation angle relative to said second section.

7. The sensor arrangement according to claim 5, wherein:
   said joint is designed for continuous adjustment of the rotation angle of said joint.

8. The sensor arrangement according to claim 7, wherein:
said joint includes a brake device, said brake device designed for fixing the rotation angle; and
said brake device creates a force fit between said first section and said second section.

9. The sensor arrangement according to claim 5, wherein the joint is a swivel joint.

10. The sensor arrangement according to claim 1, wherein:
said joint has three degrees of freedom.

11. The sensor arrangement according to claim 10, wherein the joint is a ball joint.

12. The sensor arrangement according to claim 1, wherein:
said first and second interfaces are inductive interfaces.

13. The sensor arrangement according to claim 1, wherein:
said first mechanical coupling and said second mechanical coupling are embodied as a plug-in connection having a tongue and groove structure.

14. The sensor arrangement according to claim 13, wherein:
one of said first and second mechanical couplings includes a notch, and the other coupling includes a projection complementary to said notch; and
said projection is embodied to snap into said notch for joining said two couplings.

15. The sensor arrangement according to claim 1, wherein:
said first mechanical coupling and said second mechanical coupling are arranged as a magnetic connection.

16. The sensor arrangement, according to claim 1, wherein:
the sensor is a pH sensor, an ISFET, an ion-selective sensor, a sensor embodied to measure a redox potential, a sensor embodied to measure absorption of electromagnetic waves in a medium in the UV, IR and/or visible range, a sensor embodied to measure oxygen, a sensor embodied to measure conductivity, a sensor embodied to measure turbidity, a sensor embodied to measure concentration of non-metallic materials, or a sensor embodied to measure temperature.

17. The sensor arrangement according to claim 1, wherein the first mechanical coupling and the second mechanical coupling embody a snap connection.

18. A cable for use in process automation for transmitting a value that depends on the measured value of a sensor to a superordinate unit, comprising:
an interface; and
a mechanical coupling, wherein:
said interface and said mechanical coupling are arranged in a cable housing, the cable housing including a rotatable joint;
the cable is reversibly connectable to the sensor by said mechanical coupling and a sensor mechanical coupling of the sensor to enable connecting the sensor to said superordinate unit via the cable;
said interface is configured for bidirectional communication between the sensor and said superordinate unit and further to enable energy supply to the sensor and communication to the superordinate unit; and
said mechanical coupling is arranged in an angle less than 180° to a longitudinal axis of said cable housing; and
said joint is disposed between a first section and a second section of the cable housing, the first section including the interface and the mechanical coupling, the second section including a cable attachment, said cable attachment configured to reversibly connect the cable housing to the superordinate unit.

19. The cable according to claim 18, wherein the mechanical coupling is a snap connection.

* * * * *

UNITED STATES PATENT AND TRADEMARK OFFICE
CERTIFICATE OF CORRECTION

| | | |
|---|---|---|
| PATENT NO. | : 9,829,354 B2 | Page 1 of 1 |
| APPLICATION NO. | : 14/933252 | |
| DATED | : November 28, 2017 | |
| INVENTOR(S) | : Sven-Matthias Scheibe | |

It is certified that error appears in the above-identified patent and that said Letters Patent is hereby corrected as shown below:

In the Claims

Claim 1 at Column 8, Line 18:
Insert --,-- after the word "interface" and before the word "and".

Signed and Sealed this
Nineteenth Day of June, 2018

Andrei Iancu
*Director of the United States Patent and Trademark Office*